April 20, 1937. G. F. WEATON 2,077,651
TREATMENT OF ZINCIFEROUS MATERIALS
Filed Feb. 6, 1933
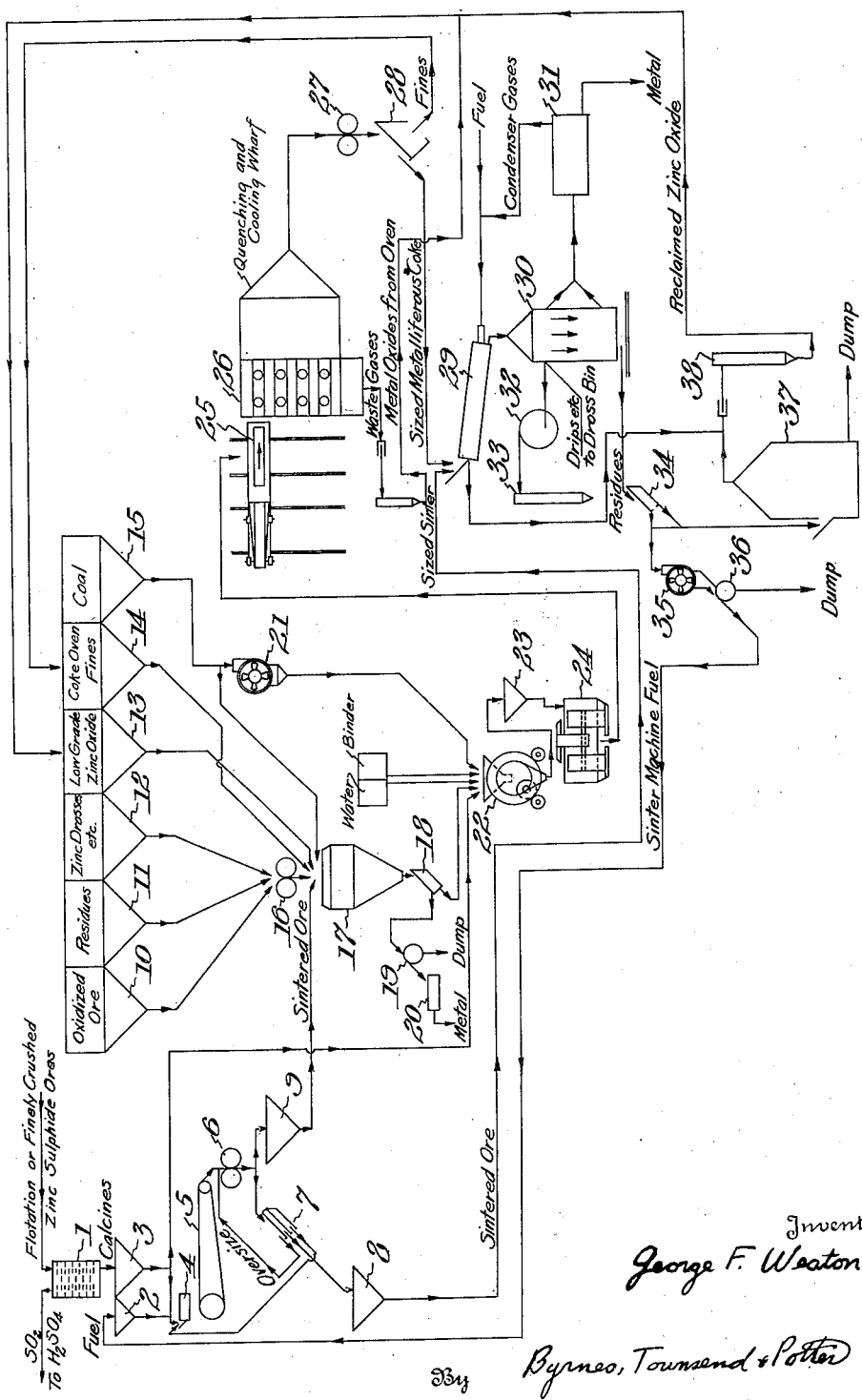

Patented Apr. 20, 1937

2,077,651

UNITED STATES PATENT OFFICE 2,077,651

TREATMENT OF ZINCIFEROUS MATERIALS

George F. Weaton, Beaver, Pa., assignor to St. Joseph Lead Company, New York, N. Y., a corporation of New York Application February 6, 1933, Serial No. 655,516

8 Claims. (Cl. 75—86)

This invention relates to the metallurgical treatment of zinciferous materials and particularly to the preparation of zinciferous materials for smelting and the recovery of metallurgical values therefrom.

It has long been realized by metallurgists that the thorough smelting of zinciferous materials was facilitated by close contact of the zinciferous materials with the carbonaceous reducing agents, and it has been proposed to mix together finely divided zinc ore and coal to form a charge for the smelting of the zinc. However, agglomerated charges made in this way have not proved satisfactory in the smelting of zinciferous materials in furnaces of the vertical shaft type, except when the intermixed materials have been pressed into relatively small shapes, or briquettes, by the use of very high pressures and thereafter submitted to a coking operation. Zinciferous cokes have been made which were satisfactory for smelting in small horizontal retorts of the Belgian block furnace type, but the metalliferous cokes heretofore produced have been unsatisfactory for use in vertical shaft furnaces.

A principal object of the present invention is to produce a metalliferous coke of high strength and hardness, suitable for smelting in vertical shaft furnaces, and particularly to produce metalliferous coke which may be smelted in a high, continuously moving vertical column in a shaft furnace without excess breakage or abrasion and without the formation of an excessive amount of fines.

A further object of the invention is to provide a method of smelting zinciferous materials of the most varied types in a uniform manner and with a substantially complete recovery of the zinc content of the materials, while reducing the amount of material which must be recirculated to a minimum.

Another object of the invention is to produce a metalliferous coke of such density and strength that full advantage may be taken of the increase in smelting efficiency and the lower temperature at which reduction takes place when the zinciferous and carbonaceous materials are intimately associated with each other. Using such a dense metalliferous coke, wherein the aggregates were finely ground and masticated very thoroughly, 95% of the zinc content of the charge has been smelted off in a period of two hours at 1000° C., while when a loose, granular mix of zinciferous materials and coke was charged into the same furnace, only 45% of the zinc in the charge was smelted off in a period of two hours at a temperature of 1200° C.

The invention also comprises the full utilization of waste heat from the residues, and the final elimination and recovery of any zinciferous material that may be present in these residues, contributing to a very high overall plant recovery of the metal content of the ores.

A further object of the invention is the production of metalliferous coke containing an excess amount of carbonaceous material incorporated with zinciferous materials, the excess carbon present being used in the reduction of sintered zinciferous ore in a reducing furnace, without additional reducing fuel other than that contained in the metalliferous coke.

The invention will be described for the purpose of illustration with particular reference to the accompanying drawing which shows a flow sheet of a method of operation embodying the principles of the invention.

Flotation concentrates or finely crushed zinc sulphide ores are roasted or desulphurized in roaster 1 by any suitable method well known to the arts. The ore is preferably roasted as described in copending application of Isbell and Weaton, Serial No. 556,942, filed August 13, 1931, wherein the roasted, calcined or oxidized ore is depleted of a large percentage of its impurities. After the roasting or desulphurizing process, the calcined ore may, if desired, be further treated and further impurities eliminated by blast roasting or sintering. If such a method is followed, the calcines, together with a sufficient amount of fuel to promote sintering, for example about 4%, together with a return burden of the undersized sinter as a screening product, may be mixed in 4 until incorporation is complete. The mix is then bedded on a sintering apparatus 5, such as the Dwight & Lloyd sintering apparatus, the fuel in the charge ignited, and a strong blast of air maintained through the bed of ore to be sintered, ultimately forming this charge into a hard, porous sintered mass.

After the sinter has been produced it may be crushed by crusher 6 and passed over a screen 7, the oversize being returned again to the crusher, the undersize being returned to the mixer 4 and thence again to the sintering machine. The intermediate product known as the "sized-sintered ore" being, for example, between +⅛ inch screen and −1 inch screen, and typically amounting to between 35 and 45 percent by weight of the materials discharged by the mixer onto the sintering machine, is passed to storage 8.

In the production of metalliferous coke, if great purity of product is desired, the entire product of the sintering machines may be crushed in crusher 6, not attempting any sizing but feeding the entire discharge from the crusher to a suitable storage for appropriate treatment as hereinafter described. If products of ordinary purity, however, are required, the calcine or oxidized ore may be made directly into metalliferous coke without the necessity of further treatment and purification by sintering. Or if the calcines have a high degree of purity and low sulphur content, high grade products may be produced without the necessity of further purification by sintering.

According to my preferred practice in the manufacture of metalliferous coke, the raw zinciferous materials used may be made up of any one of the zinciferous materials hereinafter mentioned or any suitable blend of these materials, such as sintered ore, calcines, or oxidized ores, residues and low value ores, zinc drosses, skimmings, low grade and/or dirty zinc oxides, metalliferous coke oven fines or zinc-bearing materials of any state that do not carry impurities in such quantities as to affect the products of the reduction furnace. These zinciferous materials are intimately mixed with a binder and any bituminous coal or blend of bituminous coals or other carbonaceous materials that will produce the hard, dense coke desired.

The process will be described with particular reference to a blend of all of the above mentioned zinciferous materials incorporated with carbonaceous materials to produce a metalliferous coke. Such materials as very coarse oxidized ores, residues, slags and low value ores, zinc drosses, skimmings, etc., which may have relatively coarse particles, are first crushed in the coarse crusher 16, after which they are charged into the ball mill 17 along with return fines from the metalliferous coke ovens and the sintered ore. It is preferred that these materials be ground in such a manner that 75 to 95 percent will pass a 20-mesh screen and 35 to 80 percent will pass a 100-mesh screen. Zinc drosses, skimmings, etc., carry a considerable metal content in the form of lenses, chunks, shot, strings and the like, which will not be ground up in the ball mill, but will be flattened out and freed from encrusting oxides and similar substances. The ball mill is discharged over a screen 18 of $\frac{3}{16}$ inch mesh, or other suitable size, determined by the quality of the feed. As the residues and low value ores may contain iron in the condition of shot and chunks as a result of the smelting operation, the oversize from the screen is passed over a magnetic separator 19 which will reject the iron to the dump. The remainder of the metal, being zinc in a relatively pure form, is sent to the refining furnace 20 for further refining and casting into metal.

The undersize materials from the ball mill screen are now sent to the mixer 22. At the mixer the calcines, being already in a fine state of subdivision, as much as 80% or more being −100 mesh and 20% −325 mesh, can be added to the charge without further grinding. At this point the coal, which is crushed in crusher 21, preferably being from 60 to 70 percent −20 mesh with from 20 to 30 percent −100 mesh, is also added. However, the coal may be ground much finer without detriment to the final product.

The amount of coal which is added to the mix depends upon the metal or metallic oxide content of the materials, as in my preferred practice, if the mix is so proportioned that the zinc content of the coke will be 45 to 50 percent—as when using high-grade sinter or calcine alone in the mix—only 30% coal is here added, while if the zinc content of the coke is 20 to 30 percent, from 35 to 40 percent coal will be added. The amount of carbonaceous material added, therefore, depends upon the zinc content of the coke produced, a sufficient quantity always being added to the mix to produce the desired physical properties in the finished coke.

If it is desired to introduce sized sinter, as heretofore described, into the reduction furnace along with the metalliferous coke, and reduce this sinter by means of a part of the carbon contained therein, and assuming, for example, that the zinc content of the zinciferous coke introduced into the reduction furnace incorporated in the sinter will equal that introduced by the metalliferous coke, it being understood that the properties may vary over a wide range, and the metalliferous coke will contain 30 percent zinc, at least 3% additional coal only will be added to the metalliferous coke mix to provide sufficient residue strength in the metalliferous coke after smelting has been completed and the supply of carbon necessary for the reduction of the sinter is withdrawn from the coke. However, under the same conditions of equal zinc input to the furnace by the metalliferous coke and the sinter, if the metalliferous coke contains 40% zinc, then the coal will need to be increased by at least 6% in the metalliferous coke after the carbon required for the reduction of the sinter is withdrawn.

I have found that any coal or mixture of coals that produces a high quality coke in a by-product coke oven is satisfactory for the production of the metalliferous coke herein described. In my preferred practice I use a good coking coal with a volatile content of from 26 to 30 percent, or so blend a high volatile good coking coal with a low volatile good coking coal that the resultant volatile will be from 24 to 30 percent depending upon the blend of coals used. I also endeavor to control the blend of these coals so that the oxygen content will not exceed 7% on ultimate analysis. Any good coking coal falling within the above described limits, or any blend of good coking coals falling within the above described limits, are entirely satisfactory for producing a metalliferous coke with the properties herein described.

As a binder for the above constituents, waste sulphite liquor of approximately 32° Baumé gravity may be used. I prefer to add from 3 to 4 percent of this liquor for the purpose hereinafter described. However, any binder may be used which will have proper gluten value to develop the necessary cohesive strength in the massed materials after they are tamped in the mold to permit the mass to be pushed from the mold into the oven as hereinafter described. Carbonaceous binders, such as pitch, are also satisfactory. Enough water is also added with the water-soluble binders to make the moisture content of the entire mix approximately 7 percent. No water is added with carbonaceous or other binder where incorporation depends upon heat during mixing.

After the above mentioned ingredients are all brought together at the mixer 22, preferably either of the concrete type or of the continuous drum type, in general the mixing should be carried on for not less than the equivalent of five minutes in the average type concrete mixer. The mix should not show streaks or wet and dry places, but should be uniform in color and in moisture content. I find it particularly advantageous when using waste sulphite liquor or water-soluble binders to store this mix for a period of from 24 to 48 hours in a suitable bin or other storage compartment 23 after the mixing is performed, as above described, in order that the reaction between the zinciferous materials and the slight acidity of the sulphite liquor may become complete.

This aging also permits time for the sulphite liquor or other binder of such types to thoroughly wet each particle of ore and carbonaceous material, which is a most important consideration inasmuch as the thorough wetting of each particle causes more complete interaction between the particles and much more rapid alignment into a dense mass in the subsequent mastication by the Chilean mill, resulting in a saving of power of from 20 to 30 percent based on the power actually consumed in the mastication of the materials. Also the resulting product from the Chilean mill is very much smoother, and inasmuch as the reaction between the liquor and the mixture of ore and carbonaceous material is complete, or nearly so, the subsequent temperature rise of the mix encountered when aging, which tends to cause small nodules to form, making a subsequent solid mass difficult to obtain or attainable only under pressures of 700 to 800 pounds per square inch and upward, is absent.

After proper aging the material is then fed into the Chilean mill 24 and thoroughly interworked and kneaded into a homogeneous mass by the action of the rollers on the race. We have found that for proper mastication the contact point of the rollers should exert on the material an accumulated pressure of 60,000 minute pounds per inch. The following formula indicates the proper time that the material should be in a Chilean mill of any weight or speed:

$$\text{Time in minutes} = c \div \frac{WR}{X}$$

wherein
$c$ = the constant 60,000
$W$ = weight of the rotating element of the Chilean mill on the race,
$R$ = revolutions per minute, and
$X$ = total width of all rollers.

The materials masticated in accordance with the above description will be of uniform, homogeneous texture, easily compacted together at low pressure and in proper condition to be charged into the coke oven mold. I have found that an advantageous method of charging into this mold is to lay the material down in layers of definite thickness, a layer approximately 3" thick being preferred when a 2" screen size of the crushed metalliferous coke is desired, and to tamp or otherwise compact each layer by exerting a pressure of from 15 to 30 pounds per square inch thereon. Higher pressures, of course, may be used, but are unnecessary; a pressure lower than 15 pounds per square inch when the layer is 3" thick will leave voids in the bottom inch or inch and a half of the layer zones. Therefore, if a pressure lower than 15 pounds per square inch is used, the layers must be made uneconomically thin. The advantage of laying this material in the mold in layers of some predeterminate definite thickness is that as the material cokes, cleavage planes are produced along these layer planes, and as the coke is pushed from the oven it readily breaks on these planes, making a considerable reduction in the fines to be returned for reprocessing when crushing the metalliferous coke preparatory to charging into the furnace.

In my preferred practice the oven mold 25 has a shape similar to that of the ovens in which the zinciferous and carbonaceous material is to be coked. The width of the mold is preferably, however, somewhat less than the oven; for example, ½" in 12", and with some coals the shrinkage of the mass in the oven is negligible and proper clearance must be provided to allow the coked mass to be pushed from the oven, while the height of the mold will depend upon the oven construction and the completeness of filling desired in the oven. After the mold is filled with the zinciferous and carbonaceous materials and properly tamped down or otherwise compacted under the conditions and as described above, I prefer to dry the mass within the mold for a suitable period—from 8 to 24 hours—depending upon the amount of waste heat available. This drying permits the mass to harden and develop the strength and coherence necessary to permit pushing of the entire mass into the oven without disintegration. I prefer to do this drying with the waste gases from the coke oven.

After drying and placing the mold in position, the sides of the mold are loosened, the end adjacent the oven removed, and the bottom of the mold together with the end furthermost from the oven is pushed into the oven 26 until the zinciferous and carbonaceous materials are properly placed, when the end is held and the bottom withdrawn from the oven, leaving only the zinciferous and carbonaceous material in the oven, or if preferred the bottom may be constructed of a heat-resisting alloy and left in place during the entire coking period, or the mass may be also pushed into the oven without the above mentioned bottom if a small amount of breakage is not objectionable.

In my preferred practice I heat the ovens as in standard by-product coke oven practice and preferably by the volatile gases and waste products produced during the coking period. The system contemplates the heating of the air required for combustion by recuperation or regeneration, and the recovery of any oxides that may be formed due to the distilling over of zinc during the coking period. I prefer to supply a uniform quantity of heat to the oven at all times, without attempting to vary the temperature of the wall at the beginning or end of the coking process. The wall temperature should, however, not exceed 850° C., measured one inch from the surface of the wall adjacent the material being coked.

Any width of oven coking chamber is satisfactory up to and including 16". Above that width the loss of zinc from reduction due to the sustained temperature for the longer period required along the walls becomes excessive, and in practice I prefer an oven coking chamber width of 12". The coking period will depend upon the completeness of volatile elimination desired. In a 12" oven complete freedom from volatile constituents satisfactory for charging into a furnace where high-grade oxides are to be produced is reached in approximately 12 hours, the coking propagation being effected at the rate of approximately ½" per hour from each heat supplying wall.

The temperature at the center of the mass in the oven at the finish is typically 750 to 800° C. Inasmuch as the distillate produced during coking will be used as a fuel for heating the oven, any zinc loss from the ovens during the distillation of the volatile matter and along with it, will be oxidized within the heating chambers of the ovens and ultimately recovered from the waste gases collected and returned to the system for treatment with the other materials as indicated above.

After the coking period is complete the oven is pushed in a manner well known in the coking of bituminous coals. During this pushing operation the hot metalliferous coke may be quenched a sufficient amount to prevent further combustion of either the metalliferous content or the carbon, but an insufficient amount to saturate the metalliferous coke with water or for the metalliferous coke to contain any appreciable quantity of moisture upon reaching the crusher, or it may be slowly cooled in a non-oxidizing atmosphere such as steam or other inert gases.

The coke produced by this method has to all practical purposes equivalent strength and hardness to ordinary metallurgical coke as produced in the by-product coke oven, having sufficient inherent strength to pass through a crusher without producing an unusual or excessive amount of fines which must be returned for retreatment, and having the necessary strength to properly withstand the burdens imposed in high shaft furnaces, retorts or other furnaces having high, continuously moving charge columns. Due to the intimate mixture of the zinciferous materials and the carbonaceous materials in this coke, reduction takes place very rapidly in all types of reducing apparatus. The reduction may be effected, for example, in an electric furnace wherein the resistance of the charge to the passage of current generates the necessary heat for reduction, or in retorts externally heated either by means of a solid, liquid, or gaseous fuel, or in an electric induction furnace wherein both the crucible or retort and the charge itself may be heated by induced currents, or wherein the charge is heated by the conduction and convection from the crucible of an electric induction furnace, or a combination of several of the above methods may be used. The metalliferous coke may also be burnt on a grate or other suitable apparatus for the direct production of oxides.

After a proper time for cooling and complete drying of any quenching moisture present, the coke is introduced into crusher 27, after which it passes over a screen 28. Crusher 27 is preferably so adjusted as to produce crushed particles of a maximum cubic dimension of 2½ inches. Although it has been found in practice that much larger sizes can be economically charged into the furnaces, the size of the crushed product which is satisfactory for furnaces being subject to considerable variation, I prefer particles of +½ inch and −2½ inch mesh. The product from the crusher passes over the screen, which rejects the fines produced during discharging of the oven, and having been crushed again to the proper size these fines are reincorporated into the raw mix, the over-product of the screen being sent to the furnace either as the total furnace charge or as any proportion of the furnace charge desirable, the balance being made up by the aforementioned furnace sized sinter when less than 100% of the charge is metalliferous coke.

It is obvious that the percentage of metalliferous coke charged to the furnace should not be too low; otherwise ordinary non-metalliferous coke or other satisfactory carbonaceous materials must also be charged to the furnace in order to supply a proper amount of reduction fuel for the sinter. The metalliferous coke, after preheating in 29, is charged into the reduction furnace 30 at a temperature approaching the reduction and volatilization point of the zinc. The zinciferous material is then reduced by means of indirect heat, as in an externally heated vertical retort furnace; by means of the indirect heat furnished to a crucible or charge, as in an electric induction furnace; by means of heat generated by resistance of the charge to the passage of an electric current; or by a combination of an externally heated retort and the resistance of the charge to the passage of an electric current.

From this metalliferous coke or from a combination of metalliferous coke and sinter, metallic zinc may be obtained in a suitable condenser such as that described in my copending application Serial No. 595,365, filed February 26, 1932, now Patent No. 1,901,543. The condenser gases, after proper cleaning, may be used as a source of fuel for preheating the charge to the furnace. The remainder of the heat supplied to the preheater may be supplied either by solid, liquid or gaseous fuels. The products of combustion as well as any zinc which may be volatilized during the preheating will pass along with the gas from the preheater and be recovered in a suitable collector, reclaimed, and again incorporated into the zinciferous coke batch.

The volatile products from the reduction of the zinciferous coke or the zinciferous coke and sinter may be oxidized at the furnace tuyères and a high quality zinc oxide produced. This is removed as formed by a fan and recovered in a suitable collector or bag house, as is well known to the art. In the operation of this process, for example, in the collecting and packing of the oxides some spillage occurs, the material recovered as sweepings, and the like being a source of the dirty oxides which have heretofore been referred to as being incorporated into the zinciferous coke. Incidental to the production of zinc oxide a considerable amount of metal in the form of drippings, shots, plates and the like is obtained adjacent the tuyères and manifolds. This is returned to the bin along with other drosses and skimmings for incorporation into the metalliferous coke, or the recovery of the metal after passing through the ball mill, as heretofore described.

After the completion of the reduction process, which contemplates an elimination of from 90 to 95 percent of the zinc in the zinciferous coke or sinter as charged to the furnace, the residues are discharged continuously, for example, by means of apparatus described in my application Serial No. 606,442, filed April 20, 1932, now Patent No. 1,932,388.

These residues, after being discharged, are passed over a screen 34 of approximately 1½ inch mesh, whereby the larger pieces of coke are screened out and a portion sent to a crusher 35 which crushes the pieces to preferably −20 mesh, the product then being passed over a magnetic separator 36 for the elimination of iron and iron-bearing silicates, leaving a relatively pure coke dust which is in turn incorporated into the sinter mix as a fuel for sintering the charge, as heretofore described. The −1½ inch material which passes the screen and the amount of +1½ inch mesh product which is not required in the sintering process is then passed to a residue oxidizing system, preferably such as that described in copending application of Najarian and Weaton, Serial No. 549,302, filed July 7, 1931, now Patent No. 1,973,590 wherein the carbonaceous material is completely consumed, the zinc volatilized and recovered, the recovered oxides being reclaimed and returned to the system for incorporation into the metalliferous coke, as heretofore described. This residue oxidizing furnace is admirably adapted for installation of a steam boiler or other heat reclaiming devices, the non-combustible and non-volatile residues being disposed of at this point.

I claim:

1. A method of smelting zinciferous material which comprises sintering a portion of the zinciferous material, disintegrating the sintered material into granules, mixing a further portion of the zinciferous material in comminuted condition with comminuted coal in amount sufficient to provide an excess of coke over that needed for the reduction of both portions of the zinciferous material, coking a mass of the mixture, disintegrating the coked mass into granules, combining the granules of sintered material with the granules of coked material, and subjecting a vertical column of the combined materials to a reducing temperature.

2. A method of smelting zinciferous material which comprises sintering a portion of the zinciferous material, disintegrating the sintered material into granules from about ⅜ inch to 1 inch in size, mixing a further portion of the zinciferous material in comminuted condition with comminuted coal in amount sufficient to provide an excess of coke over that needed for the reduction of both portions of the zinciferous material, coking a mass of the mixture, disintegrating the coked mass into granules, combining the granules of sintered material with the granules of coked material, and subjecting a vertical column of the combined materials to a reducing temperature.

3. A method of smelting zinciferous material which comprises sintering a portion of the zinciferous material, disintegrating the sintered material into granules, mixing a further portion of the zinciferous material in comminuted condition with comminuted coal in amount sufficient to provide an excess of coke over that needed for the reduction of both portions of the zinciferous material, coking a mass of the mixture, disintegrating the coked mass into granules from about ½ inch to 2½ inches in size, combining the granules of sintered material with the granules of coked material, and subjecting a vertical column of the combined materials to a reducing temperature.

4. A method of making a zinciferous coke adapted to be smelted in a continuously moving vertical column which comprises intermixing comminuted zinciferous material with comminuted coking coal and a binder, masticating the mixture in a Chilean mill under a total accumulative pressure of 60,000 minute pounds per inch, forming the mixture into a mass, coking the mass, and disintegrating the coked mass into granules.

5. A method of making a zinciferous coke adapted to be smelted in a continuously moving vertical column which comprises intermixing comminuted zinciferous material with comminuted coking coal, forming the mixture into a laminated mass, coking the mass, and disintegrating the coked mass into granules.

6. A method of making a zinciferous coke adapted to be smelted in a continuously moving vertical column which comprises intermixing comminuted zinciferous material with comminuted coking coal, forming the mixture into a laminated mass of approximately the size and shape of a coke oven retort, coking the mass, and disintegrating the coked mass into granules.

7. A method of making a zinciferous coke adapted to be smelted in a continuously moving vertical column which comprises intermixing comminuted zinciferous material with comminuted coking coal, forming the mixture into a laminated mass having layers approximately 3 inches thick, coking the mass, and disintegrating the coked mass into granules.

8. A method of making a zinciferous coke adapted to be smelted in a continuously moving vertical column which comprises intermixing comminuted zinciferous material with comminuted coking coal, compacting the mixture into a mass in a layer about 3 inches in thickness under pressure of about 15 to 30 pounds per square inch, coking the compacted mass and disintegrating the coked mass into granules.

GEORGE F. WEATON.